United States Patent

Nanavati

(10) Patent No.: US 6,423,416 B1
(45) Date of Patent: Jul. 23, 2002

(54) BARRIER COATING COMPOSITIONS FROM BIS-AMINOSILANES AND PHENOLIC COMPOUNDS

(75) Inventor: Shrenik Mahesh Nanavati, Midland, MI (US)

(73) Assignee: Dow Corning Corporation, Midland, MI (US)

( * ) Notice: Subject to any disclaimer, the term of this patent is extended or adjusted under 35 U.S.C. 154(b) by 0 days.

(21) Appl. No.: 09/518,736

(22) Filed: Mar. 3, 2000

(51) Int. Cl.⁷ ................ B32B 9/04; C07F 7/10
(52) U.S. Cl. ............. 428/447; 428/448; 428/450; 428/451; 556/413; 106/287.11; 427/387
(58) Field of Search ............. 428/447, 448, 428/450, 451; 427/387; 556/413; 106/287.11

(56) References Cited

U.S. PATENT DOCUMENTS

| | | | |
|---|---|---|---|
| 2,832,754 A | 4/1958 | Jex et al. ............... 260/46.5 |
| 2,920,095 A | 1/1960 | Burns et al. ........... 260/465.3 |
| 2,943,103 A | * 6/1960 | Jex et al. |
| 3,922,472 A | * 11/1975 | Foley et al. ............... 428/429 |
| 3,940,430 A | 2/1976 | Brenner et al. |
| 4,062,690 A | 12/1977 | Litherland et al. ............. 106/98 |
| 4,254,270 A | * 3/1981 | Kotzsch et al. ............. 556/413 |
| 4,393,180 A | 7/1983 | Andrews ............... 525/504 |
| 4,418,195 A | * 11/1983 | Quinlan ................. 544/58.2 |
| 5,101,055 A | 3/1992 | Dinh et al. ............... 556/413 |
| 5,215,822 A | 6/1993 | Wyman et al. ............. 428/447 |
| 5,260,350 A | 11/1993 | Wright ................. 522/42 |
| 5,374,483 A | 12/1994 | Wright ................. 428/412 |
| 5,434,007 A | 7/1995 | Yeh ................. 428/446 |
| 5,444,110 A | * 8/1995 | Kitazawa et al. ........... 524/100 |
| 5,728,770 A | * 3/1998 | Yamamoto et al. ......... 524/755 |
| 5,750,197 A | 5/1998 | van Ooij et al. ............. 427/318 |

FOREIGN PATENT DOCUMENTS

| | | | |
|---|---|---|---|
| EP | 0476202 A1 | 3/1992 | ............. C08J/7/04 |
| EP | 0875532 A1 | 11/1998 | ............. C08K/9/06 |
| FR | WO 96/34926 | 11/1996 | ......... C09D/183/04 |
| JP | 7-18221 | 1/1995 | |
| WO | WO 99/20705 | 4/1999 | ............. C09J/5/04 |

OTHER PUBLICATIONS

English Abstract of JP 55130955, Oct., 1980, assigned to Kumiai Chem.*
English Abstract of JP 05017301, Jan., 1993, Uchibori et al.*

* cited by examiner

Primary Examiner—Robert Dawson
Assistant Examiner—Jeffrey B. Robertson
(74) Attorney, Agent, or Firm—Alan Zombeck

(57) ABSTRACT

The reaction products of bis-aminosilanes and phenolic compounds provide improved barrier coating compositions. These compositions are particularly useful to reduce the diffusion of gases through organic polymer packaging materials, such as polypropylene, even in conditions involving high relative humidity.

13 Claims, No Drawings

BARRIER COATING COMPOSITIONS FROM BIS-AMINOSILANES AND PHENOLIC COMPOUNDS

FIELD OF THE INVENTION

The present invention relates to coating compositions having barrier properties which are useful in packaging applications. The coating compositions of this invention are formed by the reaction of bis-aminosilanes with phenolic compounds, and are particularly useful to reduce the diffusion of gases through organic polymer based packaging materials.

BACKGROUND OF THE INVENTION

Organic polymers, such as polypropylene and polyethylene terephthalate, have gained wide acceptance in the packaging industry because of their inherent advantages over conventional materials such as glass. However, a need exists to improve the barrier properties of organic polymer films for various packaging applications. More particularly, improvements are sought to prevent the loss of gaseous, oil, and flavor components of compositions packaged with organic polymer film substrates.

Coating compositions containing silane compounds are known to improve the gas, oil, and flavor barrier performance of organic polymer film substrates, for example as described in PCT/BE98/00006, the corresponding US equivalent of which is U.S. Ser. No. 09/341253. Moreover, the adhesion of the coating to the film surface, as well as the improved barrier characteristics provided by the silane coating, are greatly enhanced by exposing the coated film to electron beam radiation.

Useful barrier compositions are described in U.S. Pat. No. 5,215,822, which teaches a methanol solution of a vinyl benzyl amine silane, itaconic acid, and water; coating this solution on a corona treated low density polyethylene film, drying, and then subjecting the coated film to electron beam radiation to graft the coating to the film surface and further improve the barrier properties of the silane coating. However, while this coating gives excellent gas barrier properties at low to moderate relative humidity values, the gas permeability increases drastically at very high relative humidity values.

U.S. Pat. No. 5,434,007 teaches a silane resin coated on a plastic film, where the silane resin is composed of a monofunctional acrylate and an amino functional silane.

U.S. Pat. Nos. 5,260,350 and 5,374,483 relate to a silicone coating composition which, when cured on a solid substrate either by ultraviolet or electron beam radiation, provides a transparent abrasion resistant coating firmly adhered thereon. The silicone coating is prepared by reacting at least one multifunctional acrylate monomer with an amino-organofunctionalsilane, mixing the modified silane with at least one acrylic monomer and thereafter adding colloidal silica.

JP (Kokai) publication 7-18221 published on Jan. 20, 1995 teaches a surface treatment composition for gas barrier comprising an amino functional silane and a compound having an aromatic ring or hydrogenated ring.

These coatings represent a significant advance in the art. However, it has been observed that while the barrier properties of the prior art coatings are excellent in environments at relative humidities of 80% or less, their performance suffers significantly at relative humidities of 90% or more.

The present inventor has surprisingly discovered that the reaction products of an amino functional silane and a phenolic compound give excellent gas barrier properties at low to moderate relative humidity values, as well as excellent gas barrier properties at very high relative humidity values of 90% or more.

Coating compositions for improving barrier properties of organic polymer films based primarily on the reaction product of amino functional silanes and phenolic compounds heretofore are not known. Amino functional silanes are commonly used as surface treatments of silicate based materials (such as glass or silica) to enhance the adhesion of a wide variety of organic polymers. Examples of the type of organic polymers reacted with amino functional silane treated silicate materials includes phenol-formaldehyde polymers. Furthermore, the addition of phenolic compounds to phenol-formaldehyde-resin coating compositions are known. In particular, U.S. Pat. No. 4,062,690 teaches a coating composition for glass fibers based on phenol-formaldehyde-resins containing at least one monocyclic or polycyclic aromatic compound having at least three hydroxyl groups on the aromatic ring. While the '690 patent further teaches the treatment of the glass fibers with an amino functional silane, it does not specifically describe or suggest the reaction product of a amino functional silane with a non-resin phenolic compound is useful to improve the barrier properties of organic polymer films. Rather, the '690 teaches the necessity of mixing a phenolic compound in a phenol-formaldehyde-resin to obtain a coating composition.

Silamines have been reacted with phenols to create curing agents for epoxide resins, as taught in U.S. Pat. No. 4,393,180. However, these silamines differ from the amino functional silanes of the present invention in that they do not contain an alkoxy group and have not been suggested for improving the barrier properties of organic polymer films.

SUMMARY OF THE INVENTION

The present invention is directed to a composition, useful for improving the barrier properties of organic polymer films, prepared by reacting;

(A) a bis-aminosilane and (B) a phenolic compound to form a reaction product, wherein the bis-aminosilane has at least one molecule of the formula;

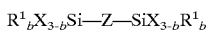

$$R^1{}_bX_{3-b}Si-Z-SiX_{3-b}R^1{}_b$$

wherein Z is $R^2NH(R^2NH)_pR^2$, each $R^1$ is a hydrocarbon group, each X is an alkoxy group with 1 to 4 carbon atoms, an oxime group or an acyloxy group, each $R^2$ is a divalent hydrocarbon group having 1 to 12 carbon atoms; b is from 0 to 3 and p is 0 or 1.

The composition can be applied to a variety of substrates used in packaging applications. The composition can be cured by further heating in the presence of moisture.

The present invention also teaches a method for preparing substrates with improved barrier properties by coating a variety of substrates used in packaging applications with the inventive compositions.

The substrates prepared by the method of the present invention show improved resistance of the substrate to transmission of gases and aromas there through. For example, a 30 micrometers uncoated biaxially oriented, corona treated polypropylene film is generally found to have a permeability to oxygen of 1200 cc/m²/day as measured according to ASTM D3985-81 at 90% relative humidity. With the preferred embodiments of the present invention, the oxygen transmission rate of the same film is reduced to less than 1 cc/m²/day as measured at 90% relative humidity. As used herein, the terminology "improved barrier" refers to a coating which can reduce oxygen transmission rate of the aforementioned un-coated polypropylene film from 1200 cc/m²/day to less than 100 cc/m²/day as measured at ASTM D3985-81 measured at 90% relative humidity.

DETAILED DESCRIPTION OF THE INVENTION

The bis-aminosilane useful as component A) in the composition of the present invention are described by the formula:

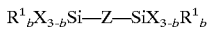

$$R^1_b X_{3-b}Si-Z-SiX_{3-b}R^1_b$$

wherein Z is $R^2NH(R^2NH)_pR^2$. In this formula each $R^1$ is preferably a monovalent hydrocarbon group having 1 to 10 carbons, for example a saturated or unsaturated aliphatic or aromatic group, for example alkyl, alkenyl, or phenyl groups; Each X is an alkoxy group with 1 to 4 carbon atoms, an oxime group or an acyloxy group. X is preferably an alkoxy group, with methoxy and ethoxy as the preferred alkoxy groups. $R^2$ is a divalent hydrocarbon group having 1 to 12 carbon atoms, preferably each $R^2$ has from 2 to 3 carbons. Each b is from 0 to 3, but is preferably 0, and p is 0 or 1. The best results are obtained by use of compounds in which each X is a methoxy group, each $R^2$ is a propylene group, b is 0, and p is 0, i.e. when the compound is bis-(γ-trimethoxysilylpropyl)amine, such as Silquest A1170 supplied by Witco/OSi, (Greenwich, Conn.). In another embodiment, the bis-aminosilane can be bis-[(3-trimethoxysilyl)propyl]-ethylenediamine, such as bis-TMSEDA from Gelest.

The bis-aminosilanes of the present invention may also be referred to as disilylated secondary amines, and can be prepared by processes known in the art, such as U.S. Pat. Nos. 2,832,754, 2,920,095, and 5,101,055.

Component B) of our composition is a phenolic compound. One skilled in the art recognizes phenolic compounds to be any compound having a structure with at least one hydroxy group substituent on an aromatic ring. The inventors believe any phenolic compound will suffice for reaction with the bis-aminosilanes described above to form the compositions of this present invention. While not to be bound by any theory, the inventors believe the hydroxy group of the phenolic compound reacts with the alkoxy group of the bis-aminosilane, liberating alcohol (corresponding to the alkoxy group on the aminosilane) and forming a complex. The complex unexpectedly provides enhanced physical properties that make them useful in the preparation of barrier coatings.

The phenolic compounds of this invention may be further substituted with a variety of chemical groups, such as hydrogen, alkyl, aryl, hydroxy, carboxylic acids, esters, thio, amino, amide, or nitro groups. Preferably, the phenolic compound has two or more hydroxy substituents on its aromatic ring.

The phenolic compounds may have one or several aromatic rings in its structure. When the phenolic compound contains polycyclic aromatic rings, the polycyclic aromatic structure is preferably chosen from the group consisting of naphthyl, anthryl, and phenanthryl derivatives. Preferred embodiments of a polycyclic aromatic phenolic compound are 1,5-dihydroxynaphthalene and 2,7-dihydroxynapthalene.

Most preferably, the phenolic compound has one aromatic ring and contains several hydroxy substituents. A specific preferred embodiment is when the phenolic compound is 1,2,3,-trihydroxybenzene, commonly know as pyrogallol.

The components of the present invention can be reacted together in a solvent. The solvent must wet the substrate and should not extend the drying time of the coating beyond what is commercially acceptable. The amount of solvent can range from about 1% to about 99%. Preferably the alcohol is present from about 5 to about 95 parts by weight of the total composition, and most preferably is present from about 70 to about 80 parts by weight of the total composition. In general, alcohols serve as suitable solvents. Preferred solvents are methanol, ethanol, n-propanol, isopropanol, butanol, and 1-methoxy-2-propanol(available as "Dowanol PM" from the Dow Chemical Co., Midland, Mich.), with methanol as the most preferred.

The coating can be applied in any desired amount, however, it is preferred that the coating be applied in a thickness ranging from 0.05 micrometers to 15 micrometers, the preferred coating thickness range being from about 0.5 to about 7 micrometers. Coating thickness can be determined by Scanning Electron Microscopy or by the use of a profiler (Tencor P-1 Long Scan Profilometer, Tencor Instruments, Santa Clara, Calif.). The coating can be applied to the substrate by any conventional method, such as spray coating, roll coating, slot coating, meniscus coating, immersion coating, and direct, offset, and reverse gravure coating.

The coating can be disposed on a wide variety of substrates, including, but not limited to polyolefins, such as oriented polypropylene (OPP), cast polypropylene, polyethylene and polyethylene copolymers, polystyrene, polyesters, such as polyethylene terephthalate (PET), or polyethylene naphthalate (PEN), polyolefin copolymers, such as ethylene vinyl acetate, ethylene acrylic acid and ethylene vinyl alcohol (EVOH), polyvinylalcohol and copolymers thereof, polyamides, such as nylon, and poly(meta-xylylene adipamide (MXD6) nylon, polyimides, polyacrylonitrile, polyvinylchloride, polyvinyl dichloride, polyvinylidene chloride, and polyacrylates, ionomers, polysaccharides, such as regenerated cellulose, and silicone, such as rubbers or sealants, other natural or synthetic rubbers, glassine or clay coated paper, paper board or craft paper, and metallized polymer films and vapor deposited metal oxide coated polymer films, such as $AlO_x$, $SiO_x$, or $TiO_x$.

The aforesaid substrates are likely to be in the form of a film or sheet, though this is not obligatory. The substrate may be a copolymer, a laminate, a coextruded, a blend, a coating or a combination of any of the substrates listed above according to the compatibility of the materials with each other. In addition, the substrate may be in the form of a rigid container made from materials such as polyethylene, polypropylene, polystyrene, polyamides, PET, EVOH, or laminates containing such materials.

The aforesaid substrates may also be pretreated prior to coating by corona treatment, plasma treatment, acid treatments and flame treatments, all of which are known in the art.

In addition, the compositions of the present invention can be used for a wide variety of packaging containers, such as pouches, tubes, bottles, vials, bag-in-boxes, stand-up pouches, gable top cartons, thermo-formed trays, brick-packs, boxes, cigarette packs and the like.

Of course, the present invention is not limited to just packaging applications, and may be used in any application wherein gas, or aroma barrier properties are desired, such as tires, buoyancy aides, inflatable devices generally, etc.

Any of the foregoing substrates may have a primer or primers applied thereon. The primers are applied to the substrates by methods known in the art such as spray coating, roll coating, slot coating, meniscus coating, immersion coating, and indirect, offset, and reverse gravure coating. Suitable primers include, but are not limited to carbodiimide, polyethylenimine, and silanes, such as N-(2-aminoethyl)-3-aminopropyltrimethoxysilane and aminopropyltriethoxysilane.

While the compositions of the present invention will form films at ambient conditions, optimum results are achieved by heat curing. Generally, the higher the temperature, the faster the coating will solidify. The upper limit to the heating is the temperature at which the substrate will undergo unacceptable distortion. Also, heating will accelerate the rate of hydrolysis of silicon/alkoxy groups and also the rate of condensation of the silicon bonded alkoxy groups with silicon bonded hydroxy groups to form silicon-oxygen-silicon groups. The composition may be dried at room temperature or in an oven at temperatures up to about 140° C., with temperatures of from about 60° C. to about 120° C. being preferred and temperatures of about 60° C. to about 80° C. being most preferred. Heating time is temperature and solvent dependent and the coating will reach tack free time in 1 to 10 seconds. The heating step serves to evaporate the solvent when used and accelerate the condensation reaction between Si—OH groups and SiOH/SiOR groups.

Various optional additives can be added to the composition to improve various properties. These additives may be added as desired and in any amount as long as they do not reduce the performance of the barrier coatings as illustrated herein. Examples of additives include additional additives as earlier described, antiblock and slip aides such as stearamide, oleamide or polar additives, such as epoxides, polyols, glycidols or polyamines, such as polyethylenimine, and other silanes may be added. Specifically excluded from the scope of the present invention are colloidal silicas and silanes or other molecules having four alkoxy or other hydrolyzable groups disposed on a single silicone or other organometalic atom, such as tetra ethoxy silane, and the like. Wetting agents, such as a polyethoxylatedalkyl phenols may also be added.

The foregoing specification describes only the preferred embodiment and the alternate embodiments of the invention. Other embodiments may be articulated as well. It is expected that others will perceive differences which while differing from the foregoing, do not depart from the spirit and scope of the invention herein described and claimed.

EXAMPLES

The following examples are presented to further illustrate the compositions of this invention, but are not to be considered as limiting the invention, which is delineated in the appended claims.

Several bis-aminosilanes and phenolic compounds were combined at varying ratios in a solvent, the resulting solutions coated as a film onto plastic substrates, and then cured in an oven. All starting materials were obtained from various commercial sources, as detailed below.

The solvent employed in all examples described below was methanol, available commercially from Fisher. The bis-(γ-trimethoxysilylpropyl)amine was obtained as Silquest A1170 from Witco/OSi, (Greenwich, Conn.). The bis-[(3-trimethoxysilyl)propyl]-ethylenediamine, used was obtained from Gelest as bis-TMSEDA (supplied as 62% solids in methanol). The pentaerythritoltetraacrylate(PETA, SR 295) was obtained from Sartomer, (Exton, Pa.). The photoinitiator was Darocur 1173 [titanium bis(ethyl-3-oxobutanoato-$O^1,O^3$)bis(2-propanolato)-]from CIBA additives (CIBA Additives Division, Tarrytown, N.Y.). All phenolic compounds, and 1,4 cyclohexanediol, were obtained and used as received from the Aldrich Chemical Company (Milwaukee, Wis.).

The coating solutions were applied to either polypropylene or polyethylene terephthalate plastic substrates utilizing a laboratory drawdown rod (from UV Supply Processes, Inc., Chicago, Ill.). The coated films were then dried and cured in an oven at 60° C. for 10 minutes. The oxygen permeability values for each film were measured and recorded in units of cc/square meter per 24 hours (day), "dry" values being measured at 0% relative humidity and "wet" values at 90% relative humidity utilizing MOCON Oxtran 2/20 Series. The MOCON instruments were obtained from Modem Controls Corporation. Coating thickness was determined by the use of a profiler (Tencor P-1 Long Scan Profilometer, Tencor Instruments, Santa Clara, Calif.).

The polypropylene substrate was corona treated 30 micrometers thick oriented polypropylene film (hereafter referred to as OPP), obtained from UCB Films (product T217/30). For comparison,the OPP base film had a permeability of about 1191 cc/square meter/day under dry conditions and 1238 cc/square meter/day under wet conditions. The polyethylene terephthlate (hereafter referred to as PET) film substrate was 48 gauge DuPont Mylar LBT2. For comparison, the PET base film had a permeability of 144 $cc/m^2$/day under dry conditions and 123 $cc/m^2$/day under wet conditions.

Example 1

A1170 alone on OPP

A solution of 8 g of A1170 and 12 g of methanol was prepared and coated on the substrate by the use of a #18 drawdown rod. After coating, drying and curing, the permeability was determined to be 62.3 $cc/m^2$/day dry and 18.8 $cc/m^2$/day wet and the coating thickness was 1.0 micrometers. No phenolic compounds were added to Example 1 to produce films that could be used as a control for comparison purposes.

Example 2 bis-TMSEDA on OPP

A solution of 4.75 g of bis-TMSEDA and 5.25 g of methanol was prepared and coated on the substrate by the use of a #18 drawdown rod. After coating, drying and curing, the permeability was determined to be 107 $cc/m^2$/day dry and 156 $cc/m^2$/day wet and the coating thickness was 4.3 micrometers.

Example 3

A1170/pyrogallol(90:10 wt) on OPP

A solution of 2.7 g of A 1170 and 7 g of methanol was prepared and 0.3 g of pyrogallol was added with stirring. This was coated on the substrate after 1 hour of mixing by the use of a #18 drawdown rod. After coating, drying and curing, the permeability was determined to be 2.3 $cc/m^2$/day dry and 0.67 $cc/m^2$/day wet and the coating thickness was 3.6 micrometers.

Example 4

A1170/pyrozallol(80:20 wt) on OPP

A solution of 2.4 g of A1170 and 7 g of methanol was prepared and 0.6 g of pyrogallol was added with stirring. This was coated on the substrate after 1 hour of mixing by the use of a #18 drawdown rod. After coating, drying and curing, the permeability was determined to be nil dry and 0.02 $cc/m^2$/day wet and the coating thickness was found to be 4.55 micrometers.

Example 5

A1170/1,2,4 trihydroxyphenol (90:10 wt) on OPP

A solution of 2.7 g of A1170 and 7 g of methanol was prepared and 0.3 g of 1,2,4 trihydroxyphenol (1,2,4 THB) was added with stirring. This was coated on the substrate after 1 hour of mixing by the use of a #18 drawdown rod. After coating, drying and curing, the permeability was determined to be 5.3 $cc/m^2$/day dry and 0.5 $cc/m^2$/day wet and the coating thickness was 3.3 micrometers.

Example 6

A1170/phloroglucinoldihydrate(90:10 wt on OPP

A solution of 2.7 g of A1170 and 7 g of methanol was prepared and 0.3 g of phloroglucinol dihydrate (PGDH) was added with stirring. This was coated on the substrate after 1 hour of mixing by the use of a #18 drawdown rod. After coating, drying and curing, the permeability was determined to be 17.2 $cc/m^2$/day dry and 3.6 $cc/m^2$/day wet and the coating thickness was 1.4 micrometers.

Example 7
bisTMSEDA/pyrozallol (95:05 wt) on OPP

A solution of 4.6 g of bisTMSEDA and 5.25 g of methanol was prepared and 0.15 g of pyrogallol was added with stirring. This was coated on the substrate after 1 hour of mixing by the use of a #18 drawdown rod. After coating, drying and curing, the permeability was determined to be 6.1 cc/m$^2$/day dry and 25.6 cc/m$^2$/day wet and the coating thickness was 3.6 micrometers.

Example 8
bisTMSEDA/pyrozallol(80:20 wt) on OPP

A solution of 3.9 g of bisTMSEDA and 5.5 g of methanol was prepared and 0.6 g of pyrogallol was added with stirring. This was coated on the substrate after 1 hour of mixing by the use of a #18 drawdown rod. After coating, drying and curing, the permeability was determined to be 0.8 cc/m$^2$/day dry and 0.52 cc/m$^2$/day wet and the coating thickness was 2.2 micrometers.

The experimental data from Examples 1–8 are summarized in Table 1. These results show the improvement in barrier properties of polypropylene from films from the reaction product of trihydroxybenzenephenolic compounds with bis-aminosilanesthereon.

This was coated on the substrate after 30 minutes of by the use of a #11 drawdown rod. After coating, drying and curing, the permeability was determined to be 36.6 cc/m$^2$/day dry and 5.4 cc/m$^2$/day wet and the coating thickness was 0.48 micrometers.

Example 10

A1170/pyrogallol(90:10) on PET

A solution of 3.2 g of and 6 kg of methanol was prepared and 275.15 g of pyrogallol was added with stirring. This was coated on the substrate after 1 hour of mixing by the use of a combination of a #20 and #14 drawdown rod. After coating, drying and curing, the permeability was determined to be 1.79 cc/m$^2$/day dry and 2.56 cc/m$^2$/day wet and the coating thickness was 1.85 micrometers.

The experimental data from Examples 9–10 are summarized in Table 2. These results show the improvement in barrier properties of polyethylene terephthalate (PET) from films formed thereon by the reaction product of trihydroxybenzenephenolic compounds with bis-aminosilanes.

TABLE 1

| Example # | Silane | Phenol | Ratio silane/phenol wt | Thickness μm | OTR[1] 0% RH cc/m$^2$/d | OTR 90% RH cc/m$^2$/d | OTR$_{predicted}$[2] 3 micrometers coating 0% RH cc/m$^2$/d | OTR$_{predicted}$[3] 3 micrometers coating 90% RH cc/m$^2$/d |
|---|---|---|---|---|---|---|---|---|
| OPP | — | — | — | — | 1191 | 1238 | — | — |
| 1 | A1170 | none | 100:0 | 1.0 | 62.3 | 18.8 | 21.5 | 6.3 |
| 3 | A1170 | pyrogallol | 90:10 | 3.6 | 2.3 | 0.67 | 2.8 | 0.8 |
| 4 | A1170 | pyrogallol | 80:20 | 4.55 | — | 0.02 | — | 0.03 |
| 5 | A1170 | 1,2,4 THB | 90:10 | 3.3 | 5.3 | 0.5 | 5.8 | 0.55 |
| 6 | A1170 | PGDH | 90:10 | 1.4 | 17.2 | 3.6 | 7.97 | 1.66 |
| 2 | TMSEDA | none | 100:0 | 4.3 | 107 | 156 | 147.6 | 212 |
| 7 | TMSEDA | pyrogallol | 95:05 | 3.6 | 6.1 | 25.6 | 7.3 | 30.6 |
| 8 | TMSEDA | pyrogallol | 80:20 | 2.2 | 0.8 | 0.52 | 1.2 | 0.38 | where:
[1]OTR is oxygen transmission rate or oxygen gas permeability
[2]OTR$_{predicted}$ was calculated by the use of the Generic Composite Permeability Eqt: Tt/Pt = Ts/Ps + Tc/Pc where T refers to the thickness, in micrometers, and P to the permeability coefficient of the composite (Tt, Pt), substrate (Ts, Ps), & coating (Tc, Pc). The substrate OPP was measured to be 30 micrometers thick and have an OTR of 1191 cc/m$^2$/day at 0% RH.
[3]same as 2 except that the permeability was measured to be 1238 cc/m$^2$/day as measured at 90% RH
[4]Permeability expected is that provided by the base film OPP itself

Example 9
A1170/pyrogallol(90:10) on PET

A solution of 908.7 g of and 4.01 kg of methanol was prepared and 104.26 g of pyrogallol was added with stirring.

TABLE 2

| Example # | Silane | Phenol | Ratio silane/phenol wt | Thickness μm | OTR[1] 0% RH cc/m$^2$/d | OTR 90% RH cc/m$^2$/d | OTR$_{predicted}$[2] 3 micrometers coating 0% RH cc/m$^2$/d | OTR$_{predicted}$[3] 3 micrometers coating 90% RH cc/m$^2$/d |
|---|---|---|---|---|---|---|---|---|
| PET | — | — | — | — | 144 | 123 | — | — |
| 9 | A1170 | pyrogallol | 90:10 | 0.48 | 36.6 | 5.4 | 7.4 | 0.9 |
| 10 | A1110 | pyrogallol | 90:10 | 1.85 | 1.79 | 2.56 | 1.1 | 1.6 | where:
[1]OTR is oxygen transmission rate or oxygen gas permeability
[2]OTR$_{predicted}$ was calculated by the use of the Generic Composite Permeability Eqt: Tt/Pt = Ts/Ps + Tc/Pc where T refers to the thickness, in micrometers, and P to the permeability coefficient of the composite (Tt, Pt), substrate (Ts, Ps), & coating (Tc, Pc). The substrate PET was measured to be 12 micrometers thick and have an OTR of 144 cc/m$^2$/day at 0% RH.
[3]same as 2 except that the permeability was measured to be 123 cc/m$^2$/day as measured at 90% RH

Example 11
A1170/resorcinol(70:30 wt)

A solution of 2.1 g of A1170 and 7 g of methanol was prepared and 0.9 g of resorcinol was added with stirring. This was coated on the substrate after 1 hour of mixing by the use of a #18 drawdown rod. After coating, drying and curing, the permeability was determined to be 1.5 cc dry and 3.3 cc wet and the coating thickness was found to be 5.2 micrometers.

Example 12
A1170/hydroquinone(90:10 wt)

A solution of 2.7 g of A1170 and 7 g of methanol was prepared and 0.3 g of hydroquinone was added with stirring. This was coated on the substrate after 1 hour of mixing by the use of a #18 drawdown rod. After coating, drying and curing, the permeability was determined to be 20.8 cc dry and 1.0 cc wet and the coating thickness was found to be 3.7 micrometers.

Example 13
A1170/catechol(70:30 wt)

A solution of 2.1 g of A1170 and 7 g of methanol was prepared and 0.9 g of catechol was added with stirring. This was coated on the substrate after 1 hour of mixing by the use of a #18 drawdown rod. After coating, drying and curing, the permeability was determined to be 22.7 cc dry and 1.4 cc wet and the coating thickness was found to be 5.1 micrometers.

Example 14
A1170/1,5-dihydroxnaphthalene(70:30 wt)

A solution of 2.1 g of A1170 and 7 g of methanol was prepared and 0.9 g of 1,5-dihydroxynaphthalene was added with stirring. This was coated on the substrate after 1 hour of mixing by the use of a #18 drawdown rod. After coating, drying and curing, the permeability was determined to be 5.1 cc dry and 0.32 cc wet and the coating thickness was found to be 2.78 micrometers.

Example 15
A1170/2,7-dihydroxnnaphthalene(70:30 wt)

A solution of 2.1 g of A1170 and 7 g of methanol was prepared and 0.9 g of 2,7-dihydroxynaphthalene was added with stirring. This was coated on the substrate after 1 hour of mixing by the use of a #18 drawdown rod. After coating, drying and curing, the permeability was determined to be 3.4 cc dry and 0.47 cc wet and the coating thickness was found to be 2.5 micrometers.

Example 16
bisTMSEDA/1,5-dihydroxynaphthalene(70:30 wt)

A solution of 3.39 g of bisTMSEDA and 5.71 g of methanol was prepared and 0.9 g of 1,5-dihydroxynaphthalene was added with stirring. This was coated on the substrate after 1 hour of mixing by the use of a #18 drawdown rod. After coating, drying and curing, the permeability was determined to be 18.0 cc dry and 8.5 cc wet and the coating thickness was found to be 2.4 micrometers.

Example 17
bisTMSEDA/2,7-dihydroxynaphthalene(70:30 wt)

A solution of 3.39 g of bisTMSEDA and 5.71 g of methanol was prepared and 0.9 g of 2,7-dihydroxynaphthalene was added with stirring. This was coated on the substrate after 1 hour of mixing by the use of a #18 drawdown rod. After coating, drying and curing, the permeability was determined to be 12.4 cc dry and 28.8 cc wet and the coating thickness was found to be 3.7 micrometers.

The experimental data from Examples 11–17 are summarized in Table 3. These results show the improvement in barrier properties of polypropylene from films formed thereon by the reaction product of dihydroxybenzenephenolic compounds with bis-aminosilanes.

TABLE 3

Examples 11–17 (bis-silyl amines + dihydroxy-aromatics)
Examples 11–17: on OPP

| Example # | Silane | Phenol type | Ratio silane/Phenol wt | Thickness $\mu$ | $OTR^1$ 0% RH cc/m$^2$/day | OTR 90% RH cc/m$^2$/day | $OTR_{predicted}^2$ 3 micrometers coating 0% RH cc/m$^2$/day | $OTR_{predicted}^3$ 3 micrometers coating 90% RH cc/m$^2$/day |
|---|---|---|---|---|---|---|---|---|
| OPP | — | — | — | — | 1191 | 1238 | — | — |
| 1 | A1170 | none | 100:0 | 1 | 62.3 | 18.8 | 21.5 | 6.3 |
| 11 | A1170 | resorcinol | 70:30 | 5.2 | 1.5 | 3.3 | 2.6 | 5.7 |
| 12 | A1170 | hydroquinone | 90:10 | 3.7 | 20.8 | 1.0 | 25.6 | 1.23 |
| 13 | A1170 | catechol | 90:10 | 5.1 | 22.7 | 1.4 | 38.1 | 2.38 |
| 14 | A1170 | 1,5-DHN$^4$ | 70:30 | 2.78 | 5.1 | 0.32 | 4.7 | 0.3 |
| 15 | A1170 | 2,7-DHN | 70:30 | 2.5 | 3.4 | 0.47 | 2.83 | 0.39 |
| 2 | bisTMSEDA | none | 100:0 | 4.3 | 107 | 156 | 147.6 | 212 |
| 16 | bisTMSEDA | 1,5-DHN | 70:30 | 2.4 | 18.0 | 8.5 | 14.5 | 6.8 |
| 17 | bisTMSEDA | 2,7-DHN | 70:30 | 3.7 | 12.4 | 28.8 | 15.3 | 35.3 | where:
$^1$OTR is oxygen transmission rate or oxygen gas permeability
$^2$OTR$_{predicted}$ was calculated by the use of the Generic Composite Permeability Eqt: Tt/Pt = Ts/Ps + Tc/Pc where T refers to the thickness, in micrometers, and P to the permeability coefficient of the composite (Tt, Pt), substrate (Ts, Ps), & coating (Tc, Pc). The substrate OPP was measured to be 30 micrometers thick and have an OTR of 1191 cc/m$^2$/day at 0% RH.
$^3$same as 2 except that the permeability was measured to be 1238 cc/m$^2$/day as measured at 90% RH
$^4$DHN is dihydroxynaphthalene

Example 18
A1170/1,5-dihydroxynaphthalene(81:19 wt)

A solution of 2.1 kg of A1170 and 10.8 kg of methanol was prepared and 0.5 Kg of 1,5-dihydroxynaphthalene was added with stirring. This was coated on the substrate after 2 hours of mixing by the use of a #14 drawdown rod. After coating, drying and curing, the permeability was determined to be 61.1 cc dry and 15.6 cc wet and the coating thickness was found to be 0.24 micrometers.

The experimental data from Example 18 are summarized in Table 4. These results show the improvement in barrier properties of polyethylene terephthalate (PET) from films formed thereon by the reaction product of a dihydroxybenzenephenolic compound with a bis-aminosilane.

Example 21
A1170/9-phenanthrol(90:10 wt)

A solution of 1.08 g of A1170 and 2.8 g of methanol was prepared and 0.12 g of 9-phenanthrol was added with stirring. This was coated on the substrate after 1 hour of mixing by the use of a #18 drawdown rod. After coating, drying and curing, the permeability was determined to be 107 cc dry and 15.01 cc wet and the coating thickness was found to be 2.77 micrometers.

Example 22
bisTMSEDA/1phenol(70:30 wt)

A solution of 3.39 g of bis-TMSEDA and 5.71 g of methanol was prepared and 0.9 g of phenol was added with

TABLE 4

Examples 18: on PET

| Example # | Silane | Phenol type | Ratio silane/ Phenol wt | Thickness $\mu$ | $OTR^1$ 0% RH $cc/m^2/day$ | OTR 90% RH $cc/m^2/day$ | $OTR_{predicted}^2$ 3 micrometers coating 0% RH $cc/m^2/day$ | $OTR_{predicted}^3$ 3 micrometers coating 90% RH $cc/m^2/day$ |
|---|---|---|---|---|---|---|---|---|
| PET | — | — | — | — | 144 | 123 | — | — |
| 18 | A1170 | 1,5-DHN[4] | 81:19 | 0.24 | 61.1 | 15.6 | 7.9 | 1.4 | where:
[1]OTR is oxygen transmission rate or oxygen gas permeability
[2]$OTR_{predicted}$ was calculated by the use of the Generic Composite Permeability Eqt: Tt/Pt = Ts/Ps + Tc/Pc where T refers to the thickness, in micrometers, and P to the permeability coefficient in the composite (Tt, Pt), substrate (Ts, Ps), & coating (Tc, Pc). The substrate PET was measured to be 12 micrometers thick and have an OTR of 144 $cc/m^2/day$ as measured at 0% RH.
[3]same as 2 except that the permeability was measured to be 123 $cc/m^2/day$ at 90% RH
[4]DHN is dihydroxynaphthalene

Example 19
A1170/Phenol(70:30 wt)

A solution of 2.1 g of A1170 and 7 g of methanol was prepared and 0.9 g of phenol was added with stirring. This was coated on the substrate after 1 hour of mixing by the use of a #18 drawdown rod. After coating, drying and curing, the permeability was determined to be 178.7 cc dry and 6.3 cc wet and the coating thickness was found to be 0.85 micrometers.

Example 20
A1170/2-Naphthol(70:30 wt)

A solution of 2.1 g of A1170 and 7 g of methanol was prepared and 0.9 g of 2-naphthol was added with stirring. This was coated on the substrate after 1 hour of mixing by the use of a #18 drawdown rod. After coating, drying and curing, the permeability was determined to be 139.4 cc dry and 46.9 cc wet and the coating thickness was found to be 3.1 micrometers.

stirring. This was coated on the substrate after 16 hour of mixing by the use of a #18 drawdown rod. After coating, drying and curing, the permeability was determined to be 106.9 cc dry and 1050 cc wet and the coating thickness was found to be 2.7 micrometers.

The experimental data from Examples 19–22 are summarized in Table 5. These results show the barrier properties of polypropylene from films formed thereon by the reaction product of monohydroxy phenolic compounds (benzene,- naphthalene &-phenanthrene type aromatic ring systems) with bis-aminosilanes.

TABLE 5

Examples 19–22: on OPP

| Example # | Silane | Phenol type | Ratio silane/ Phenol wt | Thickness $\mu$ | $OTR^1$ 0% RH $cc/m^2/day$ | OTR 90% RH $cc/m^2/day$ | $OTR_{predicted}^2$ 3 micrometers coating 0% RH $cc/m^2/day$ | $OTR_{predicted}^3$ 3 micrometers coating 90% RH $cc/m^2/day$ |
|---|---|---|---|---|---|---|---|---|
| OPP | — | — | — | — | 1191 | 1238 | — | — |
| 1 | A1170 | none | 100:0 | 1 | 62.3 | 18.8 | 21.5 | 6.3 |
| 19 | A1170 | phenol | 70:30 | 0.85 | 178.7 | 6.3 | 56.8 | 1.8 |
| 20 | A1170 | 2-naphthol | 70:30 | 3.1 | 139.4 | 46.9 | 144.2 | 48.4 |
| 21 | A1170 | 9-phenanthrol | 90:10 | 2.77 | 107 | 15.01 | 99.5 | 13.87 |

TABLE 5-continued

Examples 19–22: on OPP

| Example # | Silane | Phenol type | Ratio silane/ Phenol wt | Thickness μ | OTR[1] 0% RH cc/m²/day | OTR 90% RH cc/m²/day | OTR$_{predicted}$[2] 3 micrometers coating 0% RH cc/m²/day | OTR$_{predicted}$[3] 3 micrometers coating 90% RH cc/m²/day |
|---|---|---|---|---|---|---|---|---|
| 2 | bisTMSEDA | none | 100:0 | 4.3 | 107 | 156 | 147.6 | 212 |
| 22 | bisTMSEDA | phenol | 70:30 | 2.7 | 106.9 | 1050 | 97.4 | 1033 | where:
[1] OTR is oxygen transmission rate or oxygen gas permeability
[2] OTR$_{predicted}$ was calculated by the use of the Generic Composite Permeability Eqt: Tt/Pt = Ts/Ps + Tc/Pc where T refers to the thickness, in micrometers, and P to the permeability coefficient of the composite (Tt, Pt), substrate (Ts, Ps), & coating (Tc, Pc). The substrate OPP was measured to be 30 micrometers thick and have an OTR of 1191 cc/m²/day at 0% RH.
[3] same as 2 except that the permeability was measured to be 1238 cc/m²/day as measured at 90% RH Examples 23–24 were conducted as control experiments to demonstrate the need for using a phenolic compound in a bis-aminosilane, do not improve the barrier properties of polypropylene.

TABLE 6

Examples 23–24: on OPP

| Example # | Silane | Phenol type | Ratio silane/ Phenol wt | Thickness μ | OTR[1] 0% RH cc/m²/day | OTR 90% RH cc/m²/day | OTR$_{predicted}$[2] 3 micrometers coating 0% RH cc/m²/day | OTR$_{predicted}$[3] 3 micrometers coating 90% RH cc/m²/day |
|---|---|---|---|---|---|---|---|---|
| OPP | — | — | — | — | 1191 | 1238 | — | — |
| 1 | A1170 | none | 100:0 | 1 | 62.3 | 18.8 | 21.5 | 6.3 |
| 23 | A1170 | 1,4-CHD[4] | 90:10 | 4.48 | 132.7 | 12.4 | 187.8 | 18.4 |
| 2 | bisTMSEDA | none | 100:0 | 4.3 | 107 | 156 | 147.6 | 212 |
| 24 | bisTMSEDA | 1,4-CHD | 70:30 | 2.7 | 173.2 | 1082.5 | 158.2 | 1067.6 | where:
[1] OTR is oxygen transmission rate or oxygen gas permeability
[2] OTR$_{predicted}$ was calculated by the use of the Generic Composite Permeability Eqt: Tt/Pt = Ts/Ps + Tc/Pc where T refers to the thickness, in micrometers, and P to the permeability coefficient of the composite (Tt, Pt), substrate (Ts, Ps), & coating (Tc, Pc). The substrate OPP was measured to be 30 micrometers thick and have an OTR of 1191 cc/m²/day at 0% RH.
[3] same as 2 except that the permeability was measured to be 1238 cc/m²/day as measured at 90% RH
[4] 1,4-CHD is 1,4-cyclohexane diol the reaction with a bis-aminosilane, as opposed to a cyclic alkyl alcohol such as 1,4 cyclohexanediol

Example 23

A1170/1,4-cyclohexanediol(90:10 wt)

A solution of 2.7 g of A1170 and 7 g of methanol was prepared and 0.3 g of 1,4-cyclohexanediol was added with stirring. This was coated on the substrate after 1 hour of mixing by the use of a #18 drawdown rod. After coating, drying and curing, the permeability was determined to be 132.7 cc dry and 12.4 cc wet and the coating thickness was found to be 4.48 micrometers.

Example 24 bisTMSEDA/1,4-cyclohexanediol(70:30 wt)

A solution of 3.39 g of bisTMSEDA and 5.71 g of methanol was prepared and 0.9 g of 1,4-cyclohexanediolwas added with stirring. This was coated on the substrate after 16 hour of mixing by the use of a #18 drawdown rod. After coating, drying and curing, the permeability was determined to be 173.2 cc dry and 1082.5 cc wet and the coating thickness was found to be 2.7 micrometers.

The experimental data from Examples 23–24 are summarized in Table 6. These examples show that non-phenolic alcohols, such as 1,4 cyclohexyl alcohol, when reacted with a bis-aminosilane, do not improve the barrier properties of polypropylene.

Examples 25–27 were conducted to further demonstrate the unexpected improvements in barrier properties obtained for the reaction product species from bis-aminosilanes with phenolic compounds. In Examples 25–27, pyrogallol was added to pentaerythritol tetraacrylate (PETA) in the weight ratios as indicated. Pyrogallol is a solid, and cannot be cast into a film alone. Thus, the pyrogallol had to be cast via a coating matrix that would not react or interact with the pyrogallol. An acrylate coating composition was prepared from pentaerythritoltetraacrylate (PETA, SR 295) with and without pyrogallol, and cured with a photoinitiator(Darocur 1173 from CIBA additives) on OPP.

Example 25

PETA

A solution of 3 g of PETA and 7 g of methanol was prepared and 0.1 g of Darocur 1173 was added 5 minutes prior to coating with stirring. This was coated on the substrate after 30 mins of mixing by the use of a #18 drawdown rod. After coating, drying and curing, the permeability was determined to be 449 cc dry and 161.2 cc wet and the coating thickness was found to be 3.6 micrometers.

Example 26

PETA/pyrogallol(90:10 wt)

A solution of 2.7 g of PETA and 7 g of methanol was prepared and 0.3 g pyrogallol was added with stirring. After 1 hour, 0.1 g of Darocur 1173 was added and the mixture was coated on the substrate after an additional 30 mins of mixing by the use of a #18 drawdown rod. After coating, drying and curing, the permeability was determined to be 1164 cc dry and 348 cc wet and the coating thickness was found to be 0.93 micrometers.

Example 27
PETA/pyrogallol(70:30 wt)

A solution of 2.1 g of PETA and 7 g of methanol was prepared and 0.9 g pyrogallol was added with stirring. After 1 hour, 0.1 g of Darocur 1173 was added and the mixture was coated on the substrate after an additional 30 mins of mixing by the use of a #18 drawdown rod. After coating, drying and curing, the permeability was determined to be 553.7 cc dry and 912.5 cc wet and the coating thickness was found to be 4.7 micrometers.

The data from Examples 25–27 is summarized in Table 7 below, and show that the barrier improvements observed for reaction products of bis-aminosilanes and phenolic compounds were not due solely to the oxygen scavenging properties of the phenol (such as pyrogallol) by itself.

This mixture was coated on the substrate after 10 mins of mixing by the use of a #18 drawdown rod. After coating, drying and curing, the permeability was determined to be 1197.9 cc dry and 1322 cc wet and the coating thickness was found to be 0.9 micrometers.

Example 30
bis(trimethoxnsilylethal)benzene/pyropallol(70:30 wt)

A solution of 2.1 g of bis(trimethoxysilylethyl)benzene and 7 g of methanol was prepared and 0.9 g of pyrogallol was added with stirring. After 20 mins, 0.2 g of Tyzor DC was added. This mixture was coated on the substrate after 10 mins of mixing by the use of a #18 drawdown rod. After coating, drying and curing, the permeability was determined to be 844.2 cc dry and 1104 cc wet and the coating thickness was found to be 1.8 micrometers.

Example 31
Vinyltrimethoxvsilane/pyrogallol(70:30 wt)

A solution of 2.1 g of vinyltrimethoxy silane and 7 g of methanol was prepared and 0.9 g of pyrogallol was added with stirring. After 20 mins, 0.2 g of Tyzor DC was added. This mixture was coated on the substrate after 10 mins of

TABLE 7

Examples 25–27: on OPP

| Example # | Acrylate | Phenol | Ratio acrylate/phenol wt | Thickness $\mu$ | OTR[1] 0% RH cc/m$^2$/day | OTR 90% RH cc/m$^2$/day | OTR$_{predicted}$[2] 3 micrometers coating 0% RH cc/m$^2$/day | OTR$_{predicted}$[3] 3 micrometers coating 90% RH cc/m$^2$/day |
|---|---|---|---|---|---|---|---|---|
| OPP | — | — | — | — | 1191 | 1238 | — | — |
| 25 | PETA | none | 100:0 | 3.6 | 449 | 161.2 | 507.4 | 192.1 |
| 26 | PETA | Pyrogallol | 90:10 | 0.93 | 1164 | 348 | 1108.7 | 133.8 |
| 27 | PETA | Pyrogallol | 70:30 | 4.7 | 553.7 | 912.5 | 687.8 | 1009 | where:
[1]OTR is oxygen transmission rate or oxygen gas permeability
[2]OTR$_{predicted}$ was calculated by the use of the Generic Composite Permeability Eqt: Tt/Pt = Ts/Ps + Tc/Pc where T refers to the thickness, in micrometers, and P to the permeability coefficient of the composite (Tt, Pt), substrate (Ts, Ps), & coating (Tc, Pc). The substrate OPP was measured to be 30 micrometers thick and have an OTR of 1191 cc/m$^2$/day at 0% RH.
[3]same as 2 except that the permeability was measured to be 1238 cc/m$^2$/day as measured at 90% RH In Examples 28–32, pyrogallol was added to various non-amine functional silanes in the weight ratios as indicated. These experiments were conducted as controls to show the necessity of using an bis-aminosilane to create the compositions of the present invention. The use of non amine functional silanes with phenolic compounds did not produce suitable barrier coatings. All the non amine functional silanes were commercial products of the Dow Coming Corporation (Midland, Mich.).

Example 28
Glycidoxypropyltrimethoxvsilane/nyroaallol(70:30 wt)

A solution of 2.1 g of glycidoxypropyltrimethoxy silane and 7 g of methanol was prepared and 0.9 g of pyrogallol was added with stirring. After 20 mins, 0.2 g of Tyzor DC was added. This mixture was coated on the substrate after 10 mins of mixing by the use of a #18 drawdown rod. After coating, drying and curing, the permeability was determined to be 77.7 cc dry and 848 cc wet and the coating thickness was found to be 3.3 micrometers.

Example 29
Methyltrimethoxysilane/pyrozallol(70:30 wt)

A solution of 2.1 g of methyltrimethoxy silane and 7 g of methanol was prepared and 0.9 g of pyrogallol was added with stirring. After 20 mins, 0.2 g of Tyzor DC was added.

mixing by the use of a #18 drawdown rod. After coating, drying and curing, the permeability was determined to be 1279 cc dry and in excess of 1000 cc wet and the coating thickness was found to be 0.9 micrometers.

Example 32

Isobutyltrimethoxysilane/pyrogallol(70:30 wt)

A solution of 2.1 g of isobutyltrimethoxy silane and 7 g of methanol was prepared and 0.9 g of pyrogallol was added with stirring. After 20 mins, 0.2 g of Tyzor DC was added. This mixture was coated on the substrate after 10 mins of mixing by the use of a #18 drawdown rod. After coating, drying and curing, the permeability was determined to be 1255 cc dry and in excess of 1000 cc wet and the coating thickness was found to be 2.5 micrometers.

The use of non amine functional silanes with phenolic compounds did not produce suitable barrier coatings, as shown in Table 8.

TABLE 8

Examples 28–32: on OPP

| Example # | silane | Phenol | Ratio silane/ phenol wt | Thickness $\mu$ | $OTR^1$ 0% RH $cc/m^2/day$ | OTR 90% RH $cc/m^2/day$ | $OTR_{predicted}^2$ 3 micrometers coating 0% RH $cc/m^2/day$ | $OTR_{predicted}^3$ 3 micrometers coating 90% RH $cc/m^2/day$ |
|---|---|---|---|---|---|---|---|---|
| OPP | — | — | — | — | 1191 | 1238 | — | — |
| 3 | A1170 | pyrogallol | 90:10 | 3.6 | 2.3 | 0.67 | 2.8 | 0.8 |
| 28 | GTMS[5] | pyrogallol | 70:30 | 3.3 | 77.7 | 848 | 84.9 | 873 |
| 29 | MTMS[6] | pyrogallol | 70:30 | 0.9 | 1198 | 1322 | OPP[10] | OPP |
| 30 | bTMSB[7] | pyrogallol | 70:30 | 1.8 | 844 | 1104 | 707 | 1029 |
| 31 | VTMS[8] | pyrogallol | 70:30 | 0.9 | 1279 | >1000 | OPP | OPP |
| 32 | iBTMS[9] | pyrogallol | 70:30 | 2.5 | 1255 | >1000 | OPP | OPP | where:
[1]OTR is oxygen transmission rate or oxygen gas permeability
[2]$OTR_{predicted}$ was calculated by the use of the Generic Composite Permeability Eqt: Tt/Pt = Ts/Ps + Tc/Pc where T refers to the thickness, in micrometers, and P to the permeability coefficient of the composite (Tt, Pt), substrate (Ts, Ps), & coating (Tc, Pc). The substrate OPP was measured to be 30 micrometers thick and have an OTR of 1191 $cc/m^2/day$ at 0% RH.
[3]same as 2 except that the permeability was measured to be 1238 $cc/m^2/day$ as measured at 90% RH
[4]PHENOL is hydroxybenzene
[5]GTMS is glycidoxypropyltrimethoxy silane
[6]MTMS is methyltrimethoxy silane
[7]bTMSB is bis(trimethoxysilylethyl)benzene
[8]VTMS is vinyltrimethoxy silane
[9]iBTMS is isobutyltrimethoxy silane
[10]Permeability expected is that provided by the base film OPP itself Other variations may be made in compounds, compositions, and methods described herein without departing from the essential features of the invention. The embodiments of the invention specifically illustrated herein are exemplary only and not intended as limitations on their scope except as defined in the appended claims.

We claim:

1. A composition comprising:
   a reaction product of
   (A) a bis-aminosilane having the formula:

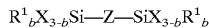

wherein Z is $R^2NH(R^2NH)_pR^2$,
   each $R^1$ is a hydrocarbon group, each X is an alkoxy group with 1 to 4 carbon atoms, an oxime group or an acyloxy group, each $R^2$ is a divalent hydrocarbon group having 1 to 12 carbon atoms; b is from 0 to 3 and p is 0 or 1; and
      (B) a phenolic compound having a polycyclic aromatic ring structure wherein said phenolic compound has substituents independently selected from the group consisting of hydrogen, alkyl, aryl, hydroxy, carboxylic acids, esters, thio, amino, amide, and nitro.

2. The composition of claim 1 wherein said phenolic compound comprises a polycyclic aromatic ring structure selected from the group consisting of naphthyl, anthryl, and phenanthryl aromatic derivatives.

3. The composition of claim 2 wherein said phenolic compound is 1,5-dihydroxynapthylene or 2,5-dihydroxynapthylene.

4. A method for preparing a substrate with improved barrier properties comprising coating the substrate with a composition comprising the reaction product of;
   (A) a bis-aminosilane having the formula:

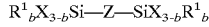

wherein Z is $R^2NH(R^2NH)_pR^2$,
   each $R^1$ is a hydrocarbon group, each X is an alkoxy group with 1 to 4 carbon atoms, an oxime group or an acyloxy group, each $R^2$ is a divalent hydrocarbon group having 1 to 12 carbon atoms; b is from 0 to 3 and p is 0 or 1; and
   (B) a phenolic compound.

5. The method of claim 4, wherein the substrate is selected from the group consisting of polyolefins; oriented polypropylene; cast polypropylene; polyethylene and polyethylene copolymer; polystyrene; polyesters; polyethylene terephthalate; polyethylene naphthalate; polyolefin copolymers; ethylene vinyl acetate; ethylene acrylic acid; ethylene vinyl alcohol; polyvinylalcohol and copolymers thereof, polyamides, nylon; and poly[meta-xylene adipamide] nylon; polyimides; polyacrylonitrile; polyvinylchloride; polyvinyl dichloride; polyvinylidene chloride; polyacrylates; ionomers; polysaccharides; regenerated cellulose; silicone; rubbers or sealants; natural and synthetic rubbers; glassine and clay coated paper; paper board; craft paper; metallized films; and vapor deposited metal oxide coated polymer films.

6. The method of claim 5, wherein the composition comprising the reaction product of;
   (A) a bis-aminosilane having the formula:

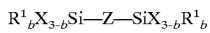

wherein Z is $R^2NH(R^2NH)_pR^2$,
   each $R^1$ is a hydrocarbon group, each X is an alkoxy group with 1 to 4 carbon atoms, an oxime group or an acyloxy group, each $R^2$ is a divalent hydrocarbon group having 1 to 12 carbon atoms; b is from 0 to 3 and p is 0 or 1; and
   (B) a phenolic compound is disposed on one or more additional substrates to form a laminate.

7. The method of claim 6, wherein the additional substrates used to form the laminate are selected from the group consisting of polyolefins; oriented polypropylene; cast polypropylene; polyethylene and polyethylene copolymer; polystyrene; polyesters; polyethylene terephthalate; polyethylene naphthalate; polyolefin copolymers; ethylene vinyl acetate; ethylene acrylic acid; ethylene vinyl alcohol; polyvinylalcohol and copolymers thereof; polyamides, nylon; and poly[meta-xylene adipamide] nylon; polyimides; polyacrylonitrile; polyvinylchloride; polyvinyl dichloride; polyvinylidene chloride; polyacrylates; ionomers; polysaccharides; regenerated cellulose; silicone; rubbers and sealants;

natural and synthetic rubbers; glassine and clay coated paper; paper board; craft paper; metallized films; and vapor deposited metal oxide coated polymer films.

8. The method of claim 4, wherein the substrate is treated with a primer.

9. The method of claim 8, wherein the primer is selected from the group consisting of a silane, polyethylenimine, and carbodiimide.

10. The method of claim 7, wherein the additional substrate or substrates are treated with a primer.

11. A substrate with improved barrier properties as prepared by the method of claim 4.

12. A substrate with improved barrier properties as prepared by the method of claim 6.

13. A substrate with improved barrier properties as prepared by the method of claim 8.

* * * * *